(12) United States Patent
Ohnishi

(10) Patent No.: US 11,584,141 B2
(45) Date of Patent: Feb. 21, 2023

(54) PRINTING APPARATUS, PRINTING METHOD, POWDERING APPARATUS, AND POWDERING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 17/284,475

(22) PCT Filed: Oct. 4, 2019

(86) PCT No.: PCT/JP2019/039271
§ 371 (c)(1),
(2) Date: Apr. 12, 2021

(87) PCT Pub. No.: WO2020/080135
PCT Pub. Date: Apr. 23, 2020

(65) Prior Publication Data
US 2021/0387463 A1 Dec. 16, 2021

(30) Foreign Application Priority Data
Oct. 18, 2018 (JP) .............................. JP2018-196817

(51) Int. Cl.
*B41J 11/00* (2006.01)
*B41M 7/00* (2006.01)

(52) U.S. Cl.
CPC ........ *B41J 11/0021* (2021.01); *B41M 7/0045* (2013.01)

(58) Field of Classification Search
CPC ...... B41J 11/00214; B41J 2/01; B41J 2/2117; C09D 11/101; C09D 11/30; C09D 11/322; C09D 11/326
See application file for complete search history.

(56) References Cited

U.S. PATENT DOCUMENTS

| 4,070,185 | A | * | 1/1978 | Kato | ..................... | G03G 5/0433 |
| | | | | | | 430/84 |
| 2008/0206488 | A1 | * | 8/2008 | Chung | ..................... | C09D 5/24 |
| | | | | | | 252/514 |

(Continued)

FOREIGN PATENT DOCUMENTS

| JP | 2017088887 | 5/2017 |
| JP | 2018044270 | 3/2018 |
| WO | 2017135425 | 8/2017 |

OTHER PUBLICATIONS

"International Search Report (Form PCT/ISA/210) of PCT/JP2019/039271", dated Nov. 19, 2019, with English translation thereof, pp. 1-3.

*Primary Examiner* — John Zimmermann
(74) *Attorney, Agent, or Firm* — JCIPRNET

(57) ABSTRACT

Powdering on a front surface of a printed matter or the like is appropriately performed. A printing apparatus configured to perform printing on a medium includes: an ink ejection portion configured to eject an ink to the medium; and a powdering portion configured to perform powdering that applies powder to the medium. The powdering portion includes: a liquid applying device configured to apply, to the medium, a powder containing liquid that is a liquid including the powder and a solvent and an energy ray emitting portion configured to irradiate the powder containing liquid applied to the medium with energy rays. The powder containing liquid is a liquid that generates heat when irradiated with energy rays. The energy ray emitting portion irradiates the powder containing liquid applied to the medium with energy rays to evaporate the solvent of the powder containing liquid, so that the powder adheres to the medium.

11 Claims, 5 Drawing Sheets

(56) References Cited

U.S. PATENT DOCUMENTS

| | | | | |
|---|---|---|---|---|
| 2008/0278055 A1* | 11/2008 | Yamashita | ............... | H01J 11/12 |
| | | | | 445/24 |
| 2009/0014716 A1* | 1/2009 | Yamaga | .............. | H01L 51/0545 |
| | | | | 257/40 |
| 2009/0212237 A1* | 8/2009 | Sugiki | ...................... | G21K 4/00 |
| | | | | 250/474.1 |
| 2009/0304917 A1* | 12/2009 | Kihira | .................... | B05D 3/102 |
| | | | | 427/142 |
| 2012/0147095 A1* | 6/2012 | Miura | ................... | B41J 2/2107 |
| | | | | 347/102 |
| 2013/0065027 A1* | 3/2013 | Mochizuki | ............. | C09D 11/40 |
| | | | | 347/100 |
| 2018/0370253 A1* | 12/2018 | Ohnishi | .................. | C09K 3/00 |
| 2019/0390076 A1* | 12/2019 | Isonaka | ................. | C09D 11/38 |
| 2022/0032660 A1* | 2/2022 | Yoda | ................. | B41J 11/00214 |

\* cited by examiner

PRINTING APPARATUS, PRINTING METHOD, POWDERING APPARATUS, AND POWDERING METHOD

CROSS-REFERENCE TO RELATED APPLICATION

This application is a 371 application of the international PCT application serial no. PCT/JP2019/039271, filed on Oct. 4, 2019, which claims the priority benefits of Japan application no. 2018-196817, filed on Oct. 18, 2018. The entirety of each of the above—mentioned patent applications is hereby incorporated by reference herein and made a part of this specification.

TECHNICAL FIELD

The present invention relates to a printing apparatus, a printing method, a powdering apparatus, and a powdering method.

BACKGROUND ART

Conventionally, evaporation-drying ink that is fixed to a medium when a solvent is evaporated has been widely used as ink for an inkjet printer. Recently, ink (fast-drying ink) that generates heat itself through irradiation with energy rays such as ultraviolet rays has been disclosed as ink of such an evaporation type (refer to Patent Literature 1, for example). When such fast-drying ink is used, for example, the ink on a medium can be efficiently dried in a short time before bleeding (such as inter-color bleeding) of the ink occurs by irradiating the ink with energy rays right after the ink lands on the medium.

CITATION LIST

Patent Literature

Patent Literature 1: WO 2017/135425

SUMMARY

Technical Problem

The fast-drying ink is new ink that is recently developed. Thus, various kinds of research and development are currently still carried out on the fast-drying ink. For example, characteristics of the fast-drying ink are desired to be exploited in wider kinds of fields. In this case, features of the fast-drying ink are expected to be exploited not only for ink bleeding prevention but also for various purposes. Thus, the present invention is intended to provide a printing apparatus, a printing method, a powdering apparatus, and a powdering method that can solve the above-described problem.

Solutions to the Problems

The inventor of the present application carried out diligent research on, for example, an application field in which fast-drying ink is used. Accordingly, the inventor has found that, for example, powdering and the like can be appropriately performed by exploiting features of the fast-drying ink. In this case, for example, powdering may be performed on the front surface of a printed matter. Through further diligent research, the inventor of the present application has found characteristics necessary for obtaining such an effect and eventually reached the present invention.

To solve the above-described problem, the present invention provides a printing apparatus configured to perform printing on a medium. The printing apparatus includes: an ink ejection portion configured to eject an ink to the medium; and a powdering portion configured to perform powdering that applies powder to the medium. The powdering portion includes: a liquid applying device configured to apply a powder containing liquid to the medium, and the powder containing liquid is a liquid including the powder and a solvent; and an energy ray emitting portion configured to irradiate the powder containing liquid applied to the medium with energy rays. The powder containing liquid is a liquid that generates heat when being irradiated with the energy rays. The energy ray emitting portion is configured to irradiate the powder containing liquid applied to the medium with the energy rays to evaporate the solvent of the powder containing liquid, so that the powder adheres to the medium.

With this configuration, since ink is ejected to a medium by the ink ejection portion, an image or the like to be printed can be appropriately drawn on the medium. Since the powder is applied to the medium by the powdering portion, powdering on the front surface of a printed matter can be appropriately performed. Since powdering is performed on the front surface of the printed matter, it is possible to appropriately prevent occurrences of offset, blocking, and the like to the medium after printing. Accordingly, for example, it is possible to prevent large decrease of image quality and the like, thereby more appropriately performing high-quality printing.

In this case, the powder is applied to the medium while being included in liquid (powder containing liquid), and thereafter the solvent in the powder containing liquid is evaporated through irradiation with energy rays, thereby making it possible to perform powdering while, for example, scattering of the powder to the vicinity is prevented. Thus, with this configuration, for example, it is possible to more appropriately perform powdering while reducing influence on the vicinity.

In this configuration, the powdering portion applies the powder, for example, on ink ejected by the ink ejection portion and applied to the medium. In this case, adhesion of the powder on ink may be, for example, adhesion of the powder to a range including the vicinity of a region in which the ink adheres. In this configuration, examples of the medium to be used may include a medium that is taken up after printing. In this case, for example, it is possible to appropriately prevent offset, blocking, and the like by performing powdering as described above. In this configuration, for example, an inkjet head configured to eject the powder containing liquid by an inkjet method can be excellently used as the liquid applying device. With this configuration, for example, it is possible to appropriately apply the powder containing liquid to the medium. In this case, it is possible to easily and appropriately perform, for example, selective powdering only at a desired position.

In this configuration, the solvent of the powder containing liquid is, for example, liquid that disperses the powder. For example, liquid that dissolves the powder may be used as the solvent, depending on a material used as the powder. Evaporation of the solvent in operation of the energy ray emitting portion may be, for example, evaporation of part of the solvent so that the powder containing liquid sufficiently dries in accordance with desired printing quality and the like. In this case, the solvent that remains after irradiation with energy rays is preferably evaporated thereafter through heating by another heating device (for example, after-heater).

In this configuration, liquid including an energy absorber as a material that generates heat by absorbing energy rays may be used as the powder containing liquid. With this configuration, for example, it is possible to appropriately heat the powder containing liquid through irradiation with energy rays. In the powder containing liquid, for example, another component such as the powder may function as the energy absorber. In this case, for example, powder of a material that generates heat by absorbing energy rays may be used as the powder. With this configuration as well, for example, it is possible to appropriately heat the powder containing liquid interposed therebetween irradiation with energy rays. More specifically, when ultraviolet rays are used as energy rays, powder of zinc oxide may be used as the powder. With this configuration, for example, it is possible to appropriately generate heat at the powder through irradiation with ultraviolet rays from the energy ray emitting portion. Accordingly, for example, it is possible to appropriately heat the powder containing liquid.

For example, liquid not including binder resin may be used as the powder containing liquid. In this case, the binder resin is resin that remains on the medium after evaporation of the solvent. For example, the powder containing liquid may include a small amount of binder resin, depending on desired printing quality and the like. With this configuration, it is possible to appropriately prevent, for example, scattering of the powder after the powder containing liquid is dried. In this case, for example, liquid including binder resin in a weight ratio of 15 weight % or lower (for example, 1 to 15 weight % approximately) relative to the entire powder containing liquid can be excellently used as the powder containing liquid.

In this configuration, the energy ray emitting portion may irradiate the powder containing liquid applying to the medium with energy rays, so that the powder containing liquid boils on the medium. With this configuration, it is possible to dry the powder containing liquid in a short time while the powder moderately scatters (diverges or disperses) to the vicinity. In this case, the energy ray emitting portion preferably heats the powder containing liquid so that the powder containing liquid abruptly boils.

In this configuration, well-known various kinds of ink may be used as ink ejected from the ink ejection portion. In this case, for example, the printing apparatus may further include an ink fixing device configured to fix the ink to the medium, and the ink is ejected onto the medium by the ink ejection portion. The ink fixing device fixes the ink by a method in accordance with characteristics of used ink. For example, fast-drying ink may be used as ink ejected from the ink ejection portion. In this case, for example, the ink ejection portion ejects ink that generates heat when irradiated with energy rays. For example, the ink fixing device irradiates the ink on the medium with energy rays to fix the ink to the medium. In this case, the ink fixing device preferably heats the ink without boiling the ink on the medium. With this configuration, it is possible to more appropriately fix the ink while preventing, for example, coarsening of the front surface of a layer of the ink.

A printing method or the like having characteristics same as those described above may be used as a configuration of the present invention. In this case as well, it is possible to obtain effects same as those described above. When characteristics of the powdering portion are focused in the above-described configuration, a powdering apparatus, a powdering method, and the like having characteristics same as those described above may be used as a configuration of the present invention. In this case as well, it is possible to obtain effects same as those described above. In this case, a powdering object may be, for example, an object other than a medium used for printing. With this configuration as well, it is possible to appropriately perform powdering on the object.

Effect of the Invention

According to the present invention, for example, it is possible to appropriately perform powdering on the front surface of a printed matter or the like.

DESCRIPTION OF THE DRAWINGS

FIGS. 1A and 1B are a top view and a sectional side view illustrating an exemplary configuration of a main part of the printing apparatus 10 in a simplified manner.

FIG. 2A illustrates an exemplary configuration of a powdering ink droplet. FIGS. 2B and 2C are diagrams for description of powder spreading when powdering is performed by using evaporation-drying powdering ink other than fast-drying powdering ink. FIGS. 2D and 2E are diagrams for description of powder spreading when powdering is performed by using fast-drying powdering ink.

DESCRIPTION OF EMBODIMENT

Figure 1A:
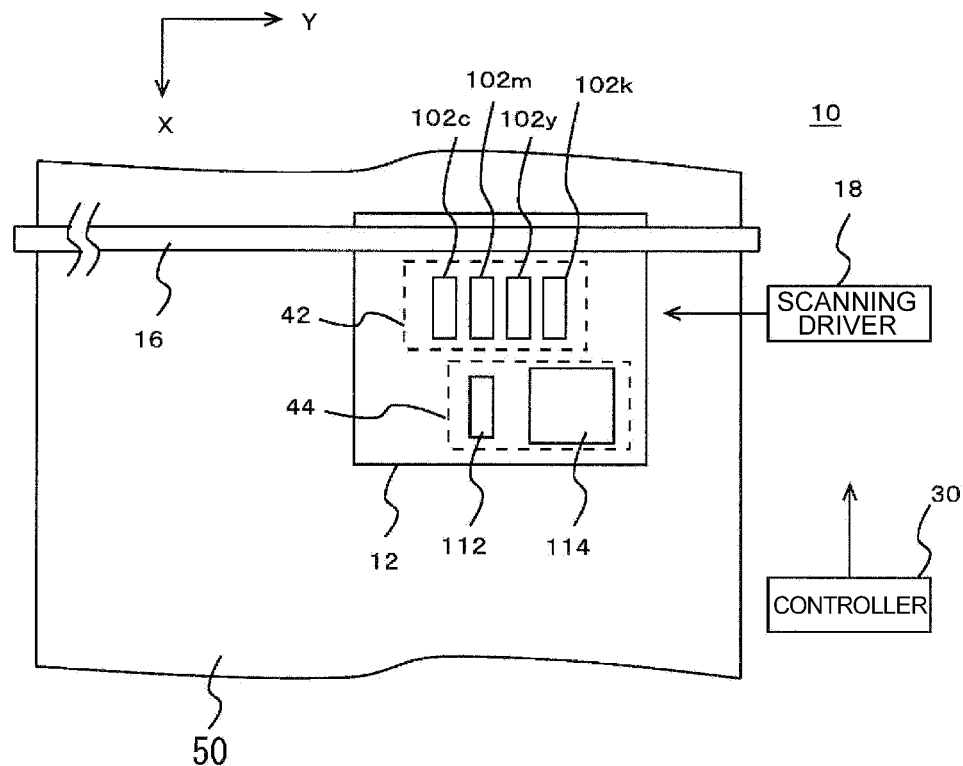
FIGS. 1A and 1B are diagrams illustrating an exemplary printing apparatus 10 according to an embodiment of the present invention.
Figure 1B:
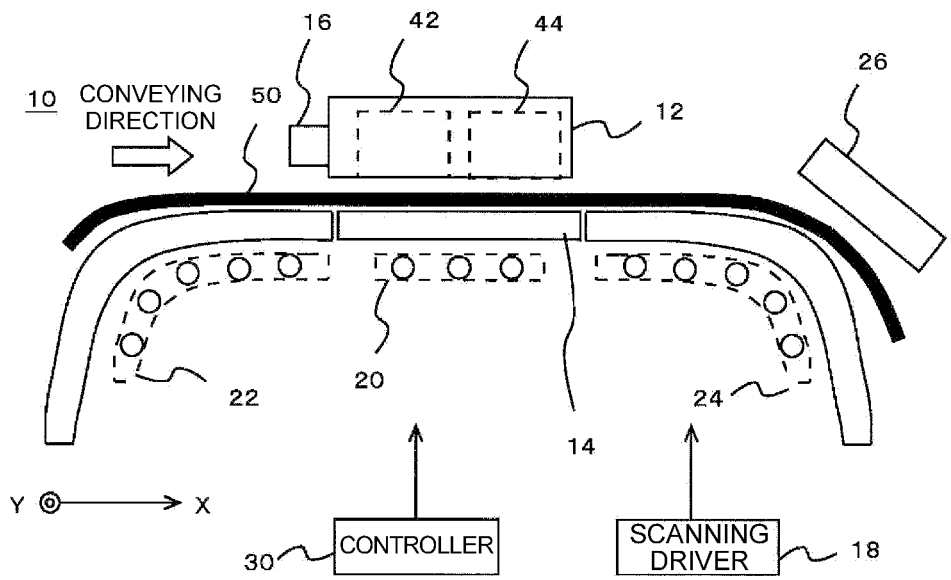

An embodiment of the present invention will be described below with reference to the accompanying drawings. FIGS. 1A and 1B illustrate an exemplary printing apparatus 10 according to the embodiment of the present invention. FIGS. 1A and 1B are a top view and a sectional side view illustrating an exemplary configuration of a main part of the printing apparatus 10 in a simplified manner. The printing apparatus 10 may have characteristics identical or similar to those of a well-known printing apparatus unless otherwise stated below. For example, the printing apparatus 10 may also include various components identical or similar to those of the well-known printing apparatus in addition to components to be described later.

In the present example, the printing apparatus 10 is an inkjet printer configured to perform printing on a print target medium 50 by an inkjet method, and includes a head 12, a platen 14, a guide rail 16, a scanning driver 18, a print heater 20, a pre-heater 22, an after-heater 24, an infrared heater 26, and a controller 30. In the present example, the medium 50 is, for example, a medium that is taken up after printing.

The head 12 is a part that ejects ink to the medium 50. In the present example, the head 12 also performs powdering that applies powder to the medium 50. The head 12 includes an ink ejection portion 42 and a powdering portion 44 as components for performing these operations.

The ink ejection portion 42 is a part that ejects ink used for printing on the medium 50, and includes a plurality of inkjet heads configured to eject ink of colors different from each other. More specifically, in the present example, the ink ejection portion 42 includes, as the plurality of inkjet heads, an inkjet head 102c, an inkjet head 102m, an inkjet head 102y, and an inkjet head 102k (hereinafter referred to as the inkjet heads 102c to k) as illustrated in FIG. 1A. The inkjet heads 102c to k are exemplary ejection heads and eject color ink of the respective colors for color printing. More specifically, the inkjet head 102c ejects ink of cyan color (C color). The inkjet head 102m ejects ink of magenta color (M color). The inkjet head 102y ejects ink of yellow color (Y color). The inkjet head 102k ejects ink of black color (K color). As illustrated in the drawings, the inkjet heads 102c to k are aligned in an X direction (X-axis direction) and disposed side by side in a Y direction (Y-axis direction) orthogonal to the X direction. In this case, the X direction is a direction parallel to a sub scanning direction in which the head 12 is moved relative to the medium 50 in sub scanning operation to be described later. The Y direction is a direction parallel to a main scanning direction in which the head 12 is moved relative to the medium 50 in main scanning operation. In this case, the main scanning operation is, for example, operation that ejects ink along with movement in the main scanning direction.

In the present example, ink ejected from the inkjet heads 102c to k is evaporation-drying ink that is fixed to the medium 50 as a solvent is evaporated. In this case, for example, well-known various kinds of ink may be used in accordance with a printing purpose and characteristics of the medium 50 being used. More specifically, in the present example, ink ejected from the inkjet heads 102c to k is not fast-drying ink but is evaporation-drying ink. Examples of such ink may include well-known solvent ink and aqueous ink. In this case, the solvent ink is, for example, ink including an organic solvent. The aqueous ink is, for example, ink including water as a main solvent. Aqueous pigment ink and aqueous latex ink can be excellently used as the aqueous ink. In a modification of the configuration of the printing apparatus 10, ink other than fast-drying ink and evaporation-drying ink may be used as ink ejected from the inkjet heads 102c to k. Examples of ink other than evaporation-drying ink may include ultraviolet (UV) curable ink, and ultraviolet light-emitting diodes (solvent UVLED) ink (solvent diluent UV ink or solvent ultraviolet (SUV) ink) obtained by diluting UV curable ink with a solvent.

The powdering portion 44 has a configuration for functioning as a powdering apparatus or powdering portion that performs the powdering, and includes an inkjet head 112 and an UV light source 114. The inkjet head 112 is an exemplary liquid applying device configured to apply a powder containing liquid to the medium 50, and ejects powdering ink as exemplary powder containing liquid toward the medium 50 by the inkjet method. In this case, the powdering ink is liquid used for the powdering and includes powder and a solvent to be applied to the medium 50 by the powdering. In the present example, ink is functional liquid. The powdering ink can be appropriately applied to the medium 50 by using the inkjet head 112. In this case, since the powdering ink is ejected by the inkjet head 112, for example, the powdering can be selectively performed only at a desired position set at part of the medium 50. In this case, for example, a place to which color ink is applied by the inkjet heads 102c to k can be selected to perform the powdering only to a necessary part, and thus, for example, cost of the powdering can also be reduced.

In the present example, the powdering ink is fast-drying ink as liquid that generates heat when irradiated with energy rays. Fast-drying ink is, for example, ink that generates heat itself through irradiation with energy rays. The heat generation of ink through irradiation with energy rays is, for example, the temperature increase of the entire ink as the energy rays are absorbed by any component in the ink. In the present example, ultraviolet rays are used as such energy rays. Characteristics of the powdering ink will be described in further detail later.

The UV light source 114 is an exemplary energy ray emitting portion and irradiates the powdering ink applied to the medium 50 with ultraviolet rays as exemplary energy rays. Accordingly, the UV light source 114 generates heat from the powdering ink on the medium 50 to evaporate the solvent of the powdering ink so that powder in the powdering ink adheres to the medium 50. In this case, the evaporation of the solvent of the powdering ink may be, for example, evaporation of part of the solvent so that the powdering ink sufficiently dries in accordance with desired printing quality and the like. In this case, the solvent that remains after the irradiation with ultraviolet rays may be evaporated thereafter through heating by another heating device (for example, the after-heater 24 or the infrared heater 26 to be described later). The UV light source 114 may be, for example, a UV fast-drying device configured to dry fast-drying ink through irradiation with ultraviolet rays. A UVLED that is an LED configured to generate ultraviolet rays can be excellently used as the UV light source 114. For example, operation that causes the powdering ink to generate heat by the UV light source 114 will also be described in further detail later.

The platen 14 is a table member that supports the medium 50 and is placed opposite the head 12 to support the medium 50. In the present example, the print heater 20, the pre-heater 22, and the after-heater 24 are housed inside the platen 14. The guide rail 16 is a rail member that guides movement of the head 12 in the main scanning operation.

The scanning driver 18 is a driver configured to cause the head 12 to perform the main scanning operation and the sub scanning operation. In this case, causing the head 12 to perform the main scanning operation and the sub scanning operation is causing the inkjet heads in the head 12 to perform the main scanning operation and the sub scanning operation. In the main scanning operation, for example, the scanning driver 18 causes the inkjet heads 102c to 102k in the ink ejection portion 42 of the head 12 to eject ink in accordance with an image to be printed while moving the head 12 along the guide rail 16. In addition, the inkjet head 112 in the powdering portion 44 of the head 12 is caused to eject the powdering ink as necessary.

In the present example, the scanning driver 18 causes the head 12 to perform the main scanning operation in an orientation of the main scanning direction. In this case, for example, the head 12 is caused to perform the main scanning operation so that the head 12 moves in an orientation in which the UV light source 114 in the powdering portion 44 is positioned behind the inkjet head 112. In addition, in this case, the scanning driver 18 returns the position of the head 12 in the main scanning direction to a reference position each time the head 12 is caused to perform the main scanning operation. In this case, it can be thought that movement of the head 12 while ejecting ink is outgoing movement, and movement of the head 12 for returning the position of the head 12 to the reference position is returning movement. In the modification of the configuration of the printing apparatus 10, the head 12 may perform the main scanning operation in one and the other orientations (both orientations) of the main scanning direction. In this case, the UV light sources 114 are preferably disposed on both sides of the inkjet head 112 in the main scanning direction in the powdering portion 44. In a case of the powdering ink, for example, a bleeding problem is normally unlikely to occur with a longer time until drying since landing. Thus, for example, the main scanning operation may be performed in both orientations with a configuration in which the UV light source 114 is disposed only on one side of the inkjet head 112 in the main scanning direction.

The scanning driver 18 changes a region facing the head 12 on the medium 50 by performing drive in the sub scanning operation between executions of the main scanning operation. In this case, the sub scanning operation is, for example, operation in which the head 12 moves relative to the medium 50 in the sub scanning direction. The scanning driver 18 performs drive in the sub scanning operation by driving, for example, a roller (not illustrated) to move the medium 50 in a conveying direction parallel to the sub scanning direction.

The print heater 20 is a heater configured to heat the medium 50 at a position facing the head 12. In the present example, the print heater 20 heats the medium 50 to heat and dry color ink ejected onto the medium 50 by the inkjet heads 102c to k. In this case, the drying of color ink is drying to an extent that at least bleeding problem does not occur in accordance with desired printing quality and the like.

When the temperature of heating by the print heater 20 is high, a problem such as nozzle clogging becomes likely to occur as the inkjet heads in the head 12 are heated. In this case, the nozzle clogging is clogging of a nozzle in the inkjet heads due to ink drying. Thus, the temperature of heating by the print heater 20 is preferably 60° C. or lower. The temperature of heating by the print heater 20 is more preferably 50° C. or lower.

The pre-heater 22 is a heater configured to heat the medium 50 on the upstream side of the head 12 in the conveying direction of the medium 50. When the pre-heater 22 is used, the initial temperature of the medium 50 can be appropriately adjusted before reaching at the position of the head 12. In this case, the temperature of heating of the medium 50 by the pre-heater 22 is preferably set to a sufficiently low temperature (for example, 50° C. or lower, preferably 40° C. or lower, more preferably 35° C. or lower) to, for example, prevent influence of environment temperature.

The after-heater 24 is a heater configured to heat the medium 50 on the downstream side of the head 12 in the conveying direction of the medium 50. The after-heater 24 may be, for example, a post-drying device configured to promote drying. When the after-heater 24 is used, ink can be more reliably dried until printing is completed. The temperature of heating of the medium 50 by the after-heater 24 may be, for example, 30 to 50° C. approximately. The temperature of heating by the after-heater 24 may be set to a high temperature equal to or lower than the heat-resistant temperature of the medium 50 being used.

The infrared heater 26 is a heater configured to heat the medium 50 through irradiation with infrared rays. An infrared light source configured to generate infrared rays including far infrared rays can be excellently used as the infrared heater 26. In the present example, the infrared heater 26 heats the medium 50 together with the after-heater 24 on the downstream side of the head 12 in the conveying direction. The infrared heater 26 may be a post heating heater using infrared rays. In the present example, as illustrated in the drawing, the infrared heater 26 is disposed at a position facing the after-heater 24 through the medium 50 and heats the medium 50 from a side opposite the after-heater 24. Accordingly, the infrared heater 26 emits infrared rays toward a surface of the medium 50 to which ink is applied. When the infrared heater 26 is used, ink can be more reliably dried until printing is completed.

Various well-known heating devices may be used as each of the print heater 20, the pre-heater 22, the after-heater 24, and the infrared heater 26. Some or all of the print heater 20, the pre-heater 22, the after-heater 24, and the infrared heater 26 may be omitted depending on an environment in which the printing apparatus 10 is used and desired printing quality.

The controller 30 is, for example, a CPU of the printing apparatus 10 and controls operation of each component of the printing apparatus 10. According to the present example, since color ink is ejected onto the medium 50 by the inkjet heads 102c to k in the ink ejection portion 42 of the head 12, an image to be printed or the like can be appropriately illustrated on the medium. In addition, since the powdering ink is ejected by the inkjet head 112 in the powdering portion 44 of the head 12 to apply powder to the medium 50, powdering on the front surface of a printed matter as a printing product can be appropriately performed.

In the present example, the positional relation between the ink ejection portion 42 and the powdering portion 44 is a relation in which the positions thereof are shifted from each other in the sub scanning direction as illustrated in the drawing. Accordingly, each of the inkjet heads 102c to k for color ink and the inkjet head 112 for the powdering ink are disposed so that the positions thereof are shifted from each other in the sub scanning direction. In this case, the powdering portion 44 is disposed on the downstream side of the ink ejection portion 42 in the conveying direction of the medium 50 to perform powdering in a region in which color ink is ejected by the ink ejection portion 42. With this configuration, the powdering portion 44 applies powder on the color ink ejected by the ink ejection portion 42 and applied to the medium. The adhesion of powder on the color ink may be adhesion of powder in a range including a region to which the color ink is applied and the vicinity. The operation of the powdering portion 44 may be operation in which powdering is performed at a timing shifted in a temporally sequential manner after a predetermined color image is printed by the inkjet heads 102c to k in the ink ejection portion 42. Such operation may be operation in which powdering is performed after the color ink is dried to a certain extent.

In this manner, according to the present example, powdering can be appropriately performed on the front surface of a printed matter. In this case, powder functions as a non-adherent spacer, and thus, for example, occurrences of offset and blocking to the medium 50 after printing can be appropriately prevented. The offset is transfer of an ink image to the back surface of the medium 50, for example, when the medium 50 is taken up or when a plurality of media 50 are placed over. The blocking is ink bonding, for example, when the medium 50 is taken up or when a plurality of media 50 are placed over. The blocking and the offset are likely to occur, for example, when the temperature (drying temperature) and time of heating of the color ink are insufficient. However, according to the present example, the occurrence of the offset, the blocking, and the like is reduced by powdering, and thus large decrease of the image quality of printing and the like can be appropriately prevented. Accordingly, high-quality printing can be more appropriately performed. In this case, for example, color fastness of a printed matter to rubbing can be increased by powdering.

Subsequently, for example, characteristics of the powdering ink and operation that causes the powdering ink to generate heat by the UV light source 114 will be described in further detail. FIGS. 2A to 2E are diagrams for further detailed description of the powdering ink.

As described above, liquid including powder and a solvent is used as the powdering ink in the present example. In this case, the solvent of the powdering ink is, for example, liquid that disperses powder. The solvent may be, for example, liquid that dissolves the powder depending on a material used as the powder. The solvent may be, for example, liquid used as a primary component of ink. The primary component of ink is, for example, a component included in a largest weight ratio in the ink. The solvent is preferably liquid in accordance with a property required for the powdering ink. The solvent may be, for example, mixed solution as a mixture of a plurality of kinds of liquid.

As described above, fast-drying ink is used as the powdering ink in the present example. Examples of such powdering ink may include liquid including an ultraviolet ray absorber (UV absorber) as a material that generates heat by absorbing ultraviolet rays. In this case, the ultraviolet ray absorber is an exemplary energy absorber. In the powdering ink, for example, another component such as the powder may function as the ultraviolet ray absorber. In this case, for example, the powder may be powder of a material that generates heat by absorbing ultraviolet rays. With this configuration, the powdering ink can be appropriately heated through irradiation with ultraviolet rays.

Figure 2A:
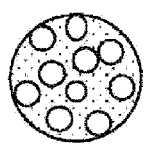
FIGS. 2A to 2E are diagrams for further detailed description of powdering ink.

In the present example, such powdering ink is ejected toward the medium 50 by the inkjet head 112 (refer to FIGS. 1A and 1B). FIG. 2A is a diagram illustrating an exemplary configuration of a droplet of the powdering ink as an ink droplet, schematically illustrating the status of the droplet in flight after being ejected from the inkjet head 112 (for example, the droplet right after ejection). In this case, as illustrated in the drawing, the droplet moves toward the medium 50 while being formed in a substantially spherical shape by surface tension.

After the powdering ink is ejected in this manner, the powder is applied to the medium 50 while being included in liquid when the powdering ink is landed on the medium 50. Thereafter, for example, the powdering ink on the medium 50 is heated through irradiation with ultraviolet rays by the UV light source 114 (refer to FIGS. 1A and 1B) to evaporate the solvent in the powdering ink so that only the powder remains on the medium 50. With this configuration, it is possible to appropriately perform powdering while preventing scattering of the powder to the vicinity and the like.

As for this point, it can be thought that, in order to only evaporate the solvent in the powdering ink, fast-drying ink does not necessarily need to be used but it suffices to dry ink by a method of heating the medium by a heater or the like. However, in the present example, powdering can be more appropriately performed by using fast-drying powdering ink as described later with reference to FIGS. 2B to 2D.

Figure 2B:
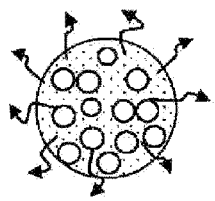
Figure 2C:
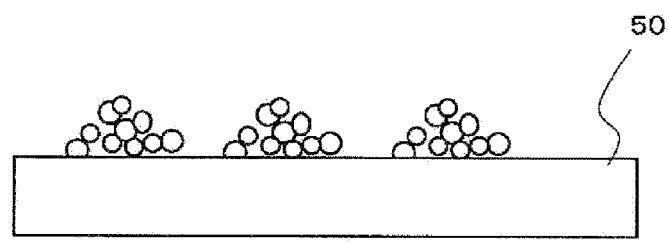

FIGS. 2B and 2C are diagrams for description of powder spreading when powdering is performed by using evaporation-drying powdering ink other than fast-drying powdering ink. FIG. 2B illustrates an exemplary state of the droplet right after landing on the medium 50. FIG. 2C illustrates exemplary powder spreading on the medium 50.

When powdering is performed by using evaporation-drying other than fast-drying powdering ink, for example, the medium 50 is heated by the print heater 20 (refer to FIGS. 1A and 1B) to evaporate the solvent in the powdering ink. In this case, as illustrated in, for example, FIG. 2B, the solvent in the powdering ink is evaporated slowly as compared to a case in which fast-drying ink is used. Then, when the solvent is sufficiently evaporated and the ink is dried, a large amount of the powder densely remains near a landing position due to a landing shape of the droplet, as illustrated in, for example, FIG. 2C. Such a state may be, for example, an aggregate state in which a larger amount of the powder remains near the landing position. When the powdering ink is dried in this manner, it is difficult to uniformly apply the powder on the medium 50, and powdering cannot be appropriately performed in some cases.

Figure 2D:
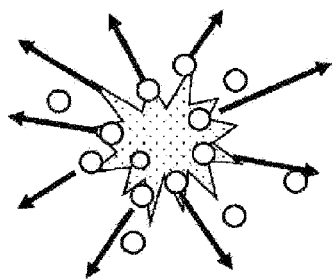
Figure 2E:
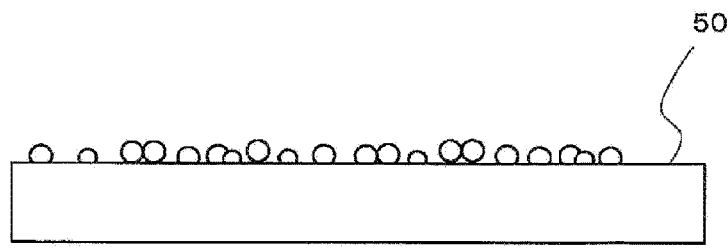

However, when fast-drying powdering ink is used, a feature that the ink is heated to a high temperature in a short time can be exploited to more appropriately perform powdering. FIGS. 2D and 2E are diagrams for description of powder spreading when powdering is performed by using fast-drying powdering ink. FIG. 2D illustrates an exemplary state of the droplet right after landing on the medium 50. FIG. 2E illustrates exemplary powder spreading on the medium 50.

As described above, when fast-drying powdering ink is used, the ink can be heated to a high temperature in a short time. In this case, the ink can be directly heated, and thus, for example, the ink can be heated to a temperature higher than that in a case of heating by the print heater 20 or the like. More specifically, in this case, for example, the ink can be temporarily increased to a temperature higher than the heat-resistant temperature of the medium 50. It is thought that when the powdering ink is heated to a higher temperature, the solvent more violently evaporates, and as a result, the powder is likely to spread to the vicinity at evaporation of the solvent.

More specifically, in this case, it is preferable that the powdering ink after landing on the medium 50 be irradiated with ultraviolet rays by the UV light source 114 so that the temperature of the powdering ink on the medium 50 is increased to a temperature equal to or higher than the boiling point of the powdering ink to boil the powdering ink. With this configuration, as illustrated in, for example, FIG. 2D, the powder scatters (diverges or disperses) to the vicinity along with boiling of the solvent around the powder. Thus, with this configuration, for example, the powder can moderately scatter to the vicinity, and the powdering ink can be more appropriately dried in a short time. In this case, it is more preferable to rapidly perform heating through irradiation with sufficiently strong ultraviolet rays so that, for example, abrupt boiling of the solvent occurs. Abrupt boiling of the solvent is boiling of the entire solvent right after irradiation with ultraviolet rays. With this configuration, for example, it is possible to appropriately prevent aggregation of the powder in the powdering ink, thereby more uniformly spreading the powder on the medium 50. Accordingly, powdering can be more appropriately performed.

The scattering state of the powder at irradiation with ultraviolet rays changes with the irradiation energy of the ultraviolet rays, and normally, the powder more largely spreads as higher energy is provided. However, a problem such as scattering of the powder to the vicinity potentially occurs as the spreading range of the powder increases. Thus, the energy (heating energy) of ultraviolet rays emitted at heating of the powdering ink is preferably optimized in accordance with the boiling point of the solvent in use, the ejection amount of the ink, the speed of printing, and the like so that the state of scattering becomes uniform and appropriate. With this configuration, powdering can be more appropriately performed with reduced influence on the vicinity.

For example, when the powdering ink is abruptly boiled, an unevaporated part of the solvent scatters to the vicinity at abrupt boiling in some cases. However, in the present example, the after-heater 24 and the infrared heater 26 (refer to FIGS. 1A and 1B) are used to further dry the ink after irradiation with ultraviolet rays (post-drying). Thus, according to the present example, the powdering ink can be more appropriately dried, for example, when the solvent has scattered due to abrupt boiling of the powdering ink.

Subsequently, characteristics of the powdering ink used in the present example will be described in further detail. As described above, in the present example, powdering by using the inkjet head 112 is performed on the medium 50 on which an image is illustrated by using the inkjet heads 102c to k. Thus, liquid that can be ejected by the inkjet method is used as the powdering ink. In this case, for example, a solvent identical or similar to a solvent of well-known inkjet-head ink can be excellently used as the solvent of the powdering ink. More specifically, for example, an organic solvent identical or similar an organic solvent used as a solvent of well-known solvent ink can be excellently used as the solvent of the powdering ink. In addition, water, alcohol, or the like other than an organic solvent can be used as the solvent of the powdering ink. Alternatively, the solvent of the powdering ink is not limited to these materials, and a solvent selected from among various general kinds of liquid may be used. In terms of prevention of influence on a user and an environment, water or an organic solvent (for example, isopropyl paraffin) incompatible with the organic solvent ordinance can be excellently used as the solvent of the powdering ink. An organic solvent compatible with the organic solvent ordinance may be used depending on the situation of an environment or facility in which the printing apparatus 10 is used and its usage.

When ink is dried by a fast-drying method, even if the boiling point of a solvent of the ink is high, the ink can be appropriately dried in a short time. Thus, for example, when an organic solvent is used as the solvent of the powdering ink, an organic solvent or the like having a boiling point higher than that of water can be excellently used. In this case, for example, an organic solvent having a boiling point of 120 to 200° C. approximately may be used as a main solvent. The main solvent is, for example, an organic solvent included at a highest weight ratio in the solvent of the powdering ink.

Various kinds of powder capable of achieving the powdering function can be used as the powder included in the powdering ink. More specifically, for example, transparent or white inorganic powder (for example, inorganic pigment) can be excellently used as the powder. For example, powder of zinc oxide, silicon oxide, diatomite, barium oxide, or titanium oxide can be excellently used as the powder. The powder may have, for example, an average particle size of 10 μm approximately or smaller, preferably 1 μm approximately or smaller. With this configuration, for example, the powdering ink can be more appropriately ejected by the inkjet method. When the size of the powder is too small, for example, the powdering function cannot be appropriately achieved. Thus, the average particle size of the powder is preferably, for example, 30 nm approximately or larger. Thus, the average particle size of the powder may be preferably, for example, 0.03 to 1 μm (30 to 1000 nm) approximately. The average particle size of the powder is more preferably, for example, 0.1 μm approximately or larger (100 nm approximately or larger).

Powder having an average particle size out of the above-described range may be used depending on usage of printing or the like. In this case, the range of the average particle size of powder usable in the present example may be, for example, the range of 30 nm to 5 μm approximately. For example, ejection is potentially unstable when the average particle size of powder is large but the diameter of the nozzle in the inkjet head 112 is small. Thus, an inkjet head having a nozzle diameter (hole diameter) larger than those of the inkjet heads 102c to k may be used as the inkjet head 112. In this case, for example, an inkjet head having a nozzle diameter of 50 μm or larger can be excellently used. In this case, the scheme (for example, drive frequency) of drive of the inkjet head 112 is preferably adjusted as appropriate in accordance with the nozzle diameter.

As described above, the powdering ink used in the present example is fast-drying ink. In this case, a material that generates heat by absorbing ultraviolet rays may be used as the powder. Such powder can be thought as, for example, powder that also functions as an ultraviolet ray absorber. As for this point, for example, a UVLED can be excellently used as the UV light source 114 that irradiates the powdering ink on the medium 50 with ultraviolet rays as described above. The UVLED may be, for example, a UVLED having a wavelength of 400 nm or shorter (for example, 360 to 385 nm approximately) at the light emission center. In this case, the powder may be powder of a material that absorbs ultraviolet rays in this range.

More specifically, for example, powder of zinc oxide can be excellently used as the powder. With this configuration, for example, the powder can be used as an ultraviolet ray absorber so that the powdering ink appropriately functions as fast-drying ink. When zinc oxide is used as the powder, a UVLED having a wavelength of 360 to 370 nm approximately at the light emission center can be excellently used as the UV light source 114.

When powder that does not function as an ultraviolet ray absorber is used, an ultraviolet ray absorber may be added as a component of the powdering ink, separately from the powder. For example, when a UVLED having a wavelength of 350 to 390 nm approximately at the light emission center is used as the UV light source 114 and an ultraviolet ray absorber is added separately from the powder, an ultraviolet ray absorber of an organic compound or the like may be added. In this case, a UVLED, the wavelength of which at the light emission center is suitable for an absorption wavelength of the used ultraviolet ray absorber is preferably used as the UV light source 114.

For example, well-known various materials such as a well-known photocuring initiator may be used as such an ultraviolet ray absorber. More specifically, examples of the ultraviolet ray absorber to be used may include an acetophenone based material, an acylphosphine oxide based photocuring initiator, an O-acyloxime based photocuring initiator, an oxime ester based photocuring initiator, a titanocene based photocuring initiator, and a two-molecule reactive photocuring initiator. Examples of the acetophenone based material to be used may include benzyldimethylketol (type) 1, α-hydroxy acetophenone (type) 2 to 6, and α-amino acetophenone (type) 7 to 9 materials. Examples of the acylphosphine oxide based photocuring initiator include monoacylphosphine oxide (MAPO) and bisacylphosphine oxide (BAPO). Examples of the O-acyloxime based photocuring initiator to be used may include O-acyloxime 16 and 17. Examples of the oxime ester based photocuring initiator include IRGACURE 01 and 02. Examples of the titanocene based photocuring initiator to be used may include titanocene. Examples of the two-molecule reactive photocuring initiator to be used may include benzophenone, thioxanthone, and ketocoumarin.

For example, a well-known material used as a cation polymerization photocuring initiator may be used as the ultraviolet ray absorber. Examples of such an ultraviolet ray absorber to be used may include an onium salt based material, iodonium salt, sulfonium salt, and a non-ionic photo cation polymerization initiator. Examples of the onium salt based material to be used may include onium salt 27 to 29. Examples of iodonium salt or sulfonium salt to be used may include iodonium 24, non-ionic diaryl iodonium salt, triaryl iodonium salt, and diphenyl iodonium salt. Examples of the non-ionic photo cation polymerization initiator to be used may include imide sulfonate and oxime sulfonate.

The powdering ink used in the present example may further include a component identical or similar to that of well-known ink other than the above-described components. For example, a disperser or a thickener is preferably further added as a component of the powdering ink. Ink including binder resin as a component is widely used as the well-known ink. In this case, binder resin is, for example, resin that remains on the medium 50 after solvent evaporation. However, binder resin is not an essential component in the powdering ink. Thus, ink not including binder resin may be used as the powdering ink.

For example, powdering ink including a small amount of binder resin may be used depending on desired printing quality and the like. In this case, for example, scattering of the powder after the powdering ink is dried can be appropriately prevented by the function of the binder resin. For example, the powder can be fixed on the medium 50 as necessary after the powdering ink is dried. When the powdering ink including binder resin is used, the contained amount of the binder resin is preferably the weight ratio of 15 weight % or lower (for example, 1 to 15 weight % approximately, preferably 2 to 10 weight % approximately) relative to the entire powdering ink. The weight ratio relative to the entire powdering ink is, for example, a weight ratio relative to the entire powdering ink before solvent evaporation (for example, before ejection from an inkjet head). With this configuration, prevention of powder scattering and the like can be appropriately achieved, for example, without hindering the function of the powdering ink.

Figure 3:
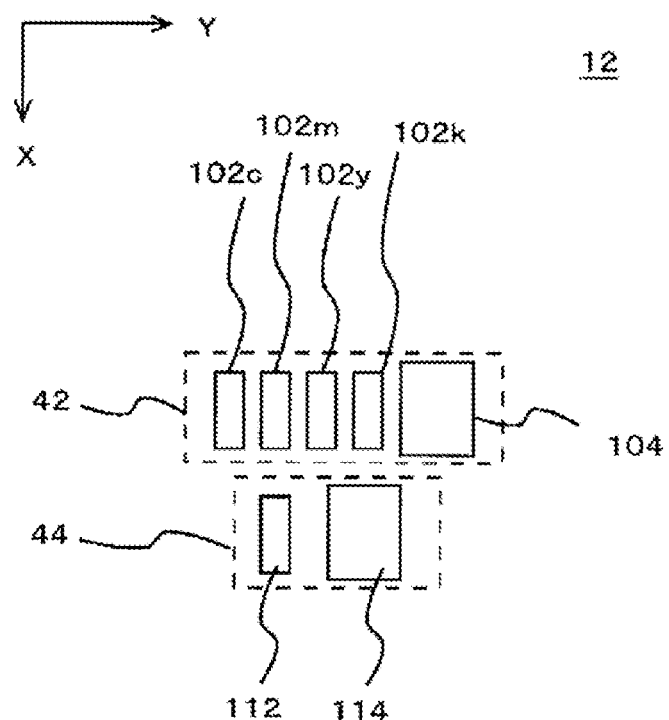
FIG. 3 is a diagram for description of a modification of the printing apparatus 10.

Subsequently, a modification of the configuration of the printing apparatus 10 and the like will be described below. FIG. 3 is a diagram for description of the modification of the printing apparatus 10, illustrating an exemplary configuration of the head 12 in the present modification. Unless otherwise stated below, in FIG. 3, a component denoted by a reference sign same as that in FIGS. 1A and 1B may have characteristics identical or similar to those of the component in FIGS. 1A and 1B. In the printing apparatus 10 of the present modification, a component other than the head 12 may be identical or similar to that of the printing apparatus 10 illustrated in FIGS. 1A and 1B.

In the printing apparatus 10 described above with reference to FIGS. 1A and 1B and the like, evaporation-drying ink, not fast-drying ink, is used as the color ink ejected from the inkjet heads 102c to k. However, in the present modification, fast-drying ink that generates heat by absorbing ultraviolet rays is used as the color ink. As illustrated in the drawing, for example, the ink ejection portion 42 in the head 12 further includes a UV light source 104 in addition to the inkjet heads 102c to k. The UV light source 104 is a light source configured to generate ultraviolet rays for generating heat at the color ink ejected from the inkjet heads 102c to k and is disposed on one side of the inkjet heads 102c to k in the main scanning direction so that the position of at least part thereof overlaps the inkjet heads 102c to k in the X direction. Accordingly, in each main scanning operation, the UV light source 104 irradiates the color ink applied to the medium with ultraviolet rays right after landing. With this configuration, for example, the viscosity of the color ink can be appropriately increased before bleeding occurs to the color ink. In this case, bleeding of the color ink can be prevented when printing is performed with a smaller number of passes. Thus, for example, fast printing can be performed with a reduced number of passes.

In the present modification, the UV light source 104 is an exemplary fixing device configured to fix the color ink to the medium. A UVLED can be excellently used as the UV light source 104. The UV light source 104 irradiates the color ink on the medium with ultraviolet rays to evaporate at least part of the solvent in the color ink. In this case, evaporation of at least part of the solvent in the color ink is volatilization and removal of the solvent in the color ink so that the viscosity of the color ink increases to an extent that bleeding does not occurs. No occurrence of bleeding is no occurrence of bleeding, which would cause problem to desired printing quality, to the ink landed on the medium.

As described above, for drying, fast-drying powdering ink is preferably irradiated with ultraviolet rays so that the powdering ink boils on the medium. However, when the color ink boils on the medium, the surface of a layer of the ink is coarsened, which potentially affects printing quality. Thus, irradiation of the color ink with ultraviolet rays by the UV light source 104 is preferably performed under a condition that the color ink does not boil on the medium. With this configuration, it is possible to more appropriately fix the color ink to the medium while preventing coarsening of the surface of a layer of the color ink and the like.

As described above, in the present modification, the UV light source 104 is disposed on one side of the inkjet heads 102c to k in the main scanning direction. In this case, the main scanning operation may be performed in an orientation in which the UV light source 104 is positioned on the back side of the inkjet heads 102c to k. In another modification of the configuration of the printing apparatus 10, the main scanning operation may be performed in both orientations by using fast-drying color ink. In this case, in the ink ejection portion 42, the UV light sources 104 are preferably disposed on one side and the other side of the inkjet heads 102c to k in the main scanning direction. Various kinds of ink other than the above-described ink may be used as the color ink. In this case, a means for fixing the ink by a method in accordance with characteristics of used ink is preferably used as an ink fixing device configured to fix the color ink to the medium.

In this case, in each main scanning operation, the inkjet heads 102c to k for color ink and the inkjet head 112 for powdering ink move together. Such a configuration can be thought as, for example, a configuration in which the inkjet heads 102c to k for color ink and the inkjet head 112 for powdering ink are held by one carriage.

Figure 4:
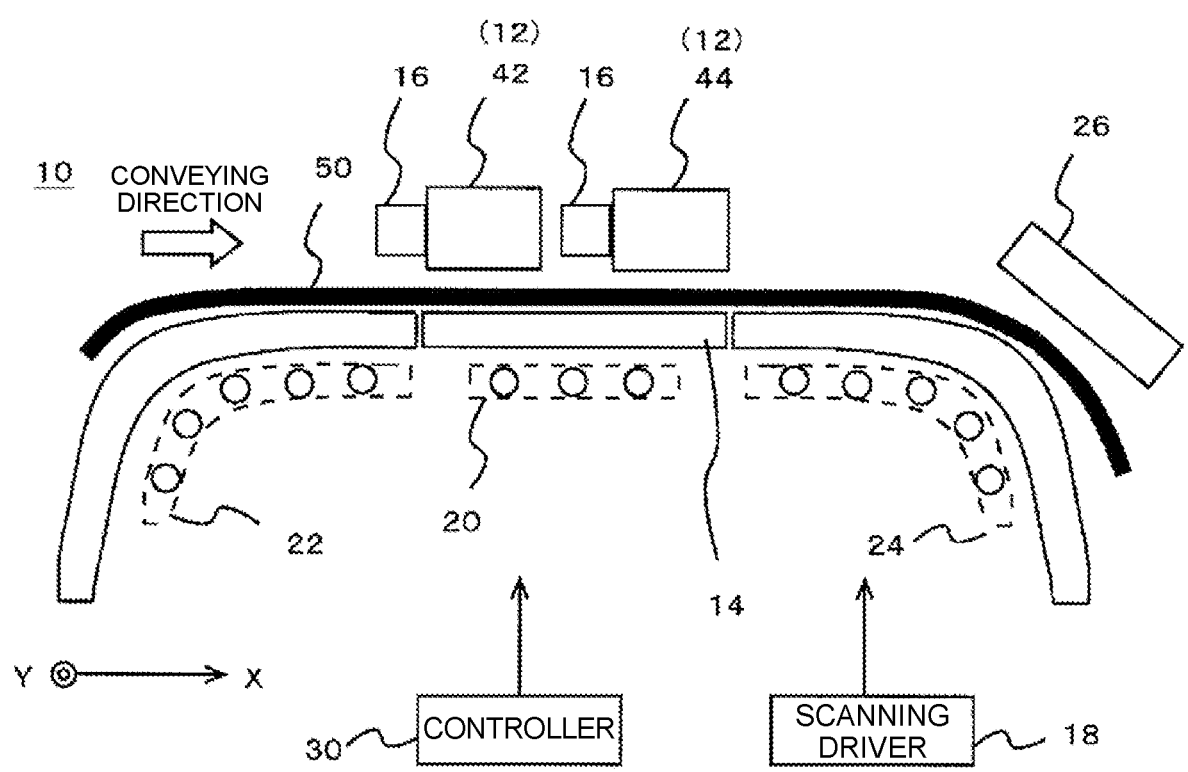
FIG. 4 is a diagram illustrating another modification of the configuration of the printing apparatus 10.

The configuration of the printing apparatus 10 may be further changed. FIG. 4 illustrates another modification of the configuration of the printing apparatus 10. In FIG. 4, a component denoted by a reference sign same as that in FIGS. 1A to 3 may have characteristics identical or similar to those of the component in FIGS. 1A to 3 unless otherwise stated below.

The above description is mainly made on the configuration in which one head 12 includes the ink ejection portion 42 and the powdering portion 44. In this case, in the head 12, each component of the ink ejection portion 42 and the powdering portion 44 is held by, for example, a carriage (not illustrated) in FIGS. 1A and 1B or the like.

However, in the present modification, the printing apparatus 10 includes a head 12 including the powdering portion 44, separately from a head 12 including the ink ejection portion 42. This configuration can be thought as, for example, a configuration in which the printing apparatus 10 includes a plurality of heads 12 among which a first head 12 includes the ink ejection portion 42 and a second head 12 includes the powdering portion 44. The configuration can be also thought as, for example, a configuration in which the inkjet head 112 for powdering ink is held by a carriage different from a carriage holding the inkjet heads 102c to k for color ink. In this case, a plurality of guide rails 16 corresponding to the plurality of respective heads 12 may be further included as illustrated in the drawing. In this case, in the scanning driver 18, drive in the main scanning operation and the like is preferably performed by using a plurality of drive motors corresponding to the respective heads 12. With this configuration, for example, the head 12 including the ink ejection portion 42 and the head 12 including the powdering portion 44 can be moved independently from each other. In this case, a resolution at which color ink is ejected by the inkjet heads 102c to k in the ink ejection portion 42 may be different from a resolution at which the powdering ink is ejected by the inkjet head 112 in the powdering portion 44. Thus, in this case, the scanning driver 18 may cause the heads 12 to perform the main scanning operation and the like at drive pitches different from each other.

The above description is mainly made on the exemplary configuration of the printing apparatus 10 in which the ink ejection portion 42 and the powdering portion 44 are disposed close to each other. However, the powdering portion 44 may be disposed, for example, at a position separated from the ink ejection portion 42 to some extent. For example, in the printing apparatus 10, the ink ejection portion 42 and the powdering portion 44 may be installed in separate housings.

Figure 5:
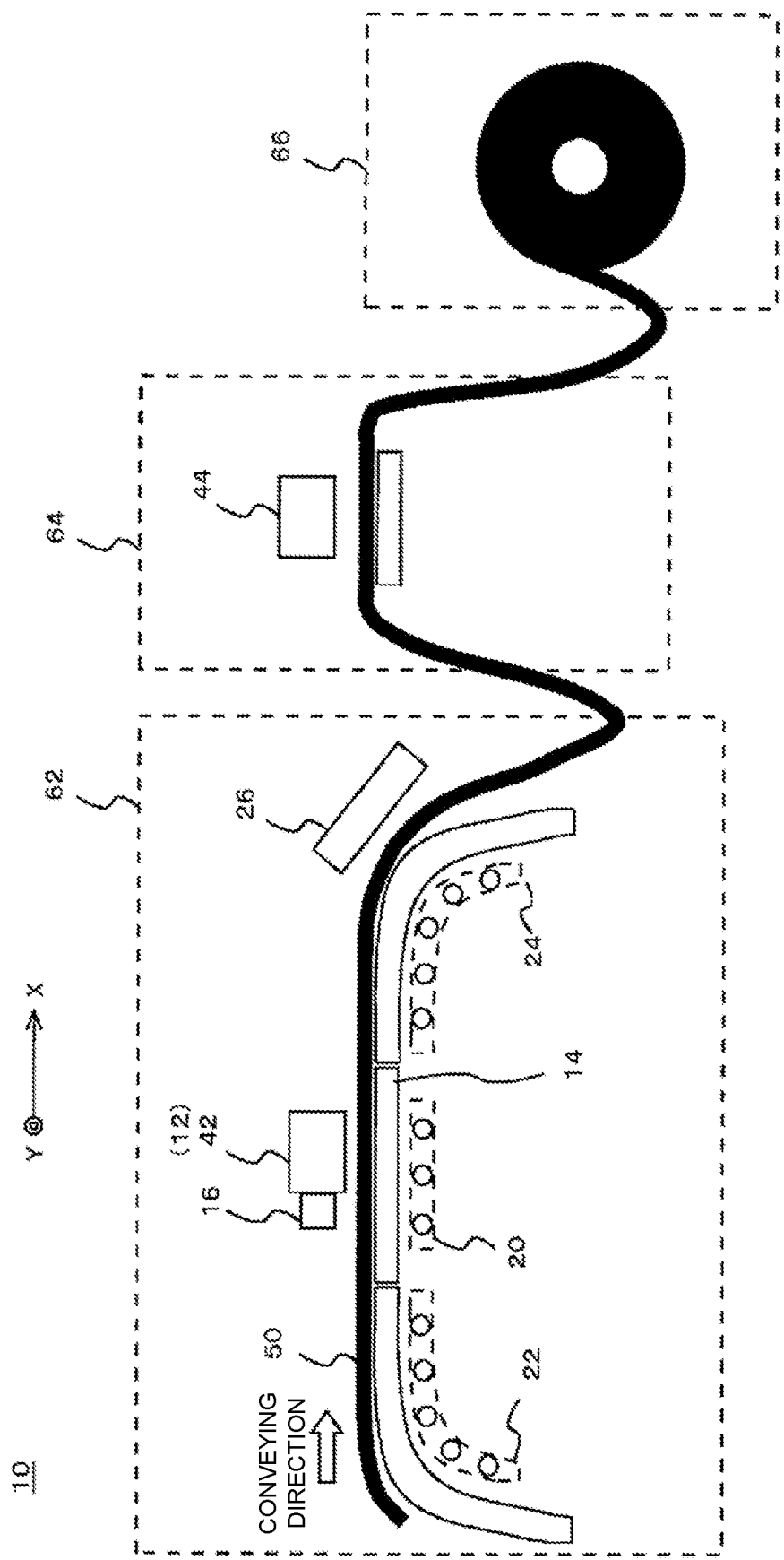
FIG. 5 is a diagram illustrating another modification of the configuration of the printing apparatus 10.

FIG. 5 illustrates another modification of the configuration of the printing apparatus 10. In FIG. 5, a component denoted by a reference sign same as that in FIGS. 1A to 4 may have characteristics identical or similar to those of the component in FIGS. 1A to 4 unless otherwise stated below.

In the present modification, the printing apparatus 10 is constituted by a plurality of housings. The printing apparatus 10 includes a printing portion 62, a powdering portion 64, and a take-up portion 66 as parts corresponding to the plurality of housings. The printing portion 62 is a part configured to perform printing on the medium 50 with color ink. The printing portion 62 can be thought as, for example, a part or the like corresponding to a printing apparatus that does not perform powdering. The configuration of the printing portion 62 can be thought as, for example, the configuration of the printing apparatus 10 illustrated in FIGS. 1A and 1B and the like, from which a part corresponding to the powdering portion 44 is omitted.

The powdering portion 64 is a part for performing powdering on the medium 50 and includes at least the powdering portion 44. The powdering portion 64 is disposed on the downstream side of the printing portion 62 in the conveying direction of the medium 50 and coupled with the printing portion 62 to perform powdering on the medium 50 on which printing has been performed at the printing portion 62. The configuration of the powdering portion 64 can be thought as, for example, the configuration of the printing apparatus 10 illustrated in FIGS. 1A and 1B and the like from which a part corresponding to the powdering portion 44 is omitted. In this case, the powdering portion 64 preferably further includes, in addition to the powdering portion 44, various components used to perform powdering, such as a table member configured to support the medium 50. The configuration of the present modification can be thought as, for example, an exemplary configuration in which the powdering portion 44 is installed in a housing different from that of the ink ejection portion 42. When the powdering portion 44 is disposed at a position separated from the ink ejection portion 42 as in the present modification, powdering can be performed without image printing operation taken into consideration. Thus, for example, a configuration capable of simultaneously performing powdering on a larger area can be excellently used as the powdering portion 44.

The take-up portion 66 is a component for taking up the medium 50 on which printing has been performed, and includes a take-up roller for taking up the medium 50 as illustrated in the drawing, for example. In the present modification, the take-up portion 66 is disposed on the downstream side of the powdering portion 64 in the conveying direction of the medium 50 and coupled with the powdering portion 64 to take up the medium 50 on which powdering has been performed at the powdering portion 64. In the present modification as well, powdering on the medium 50 can be appropriately performed. Accordingly, for example, offset and blocking can be appropriately prevented from occurring to the medium 50 taken up at the take-up portion 66.

The following provides supplemental description related to each configuration described above, description of any other modification, and the like. For the purpose of description, the above-described configurations are collectively referred to as the present example below.

As described above, according to the present example, it is possible to appropriately prevent offset, blocking, and the like from occurring to the medium 50 after printing. Accordingly, it is possible to more appropriately perform printing on the large-sized medium 50 such as the medium 50 that is taken up after printing. As for this point, such printing on the large-sized medium 50 is often performed in, for example, a sign graphics field. Conventionally, a multipath wide format printer (hereinafter referred to as MWP) has been used as a printing apparatus configured to perform such printing on the large-sized medium 50. Thus, a configuration for performing powdering as in the present example can be excellently used in, for example, the sign graphics field in which printing is performed by the MWP in particular. The configuration of the present example is applicable to various usages other than the MWP and the like. More specifically, for example, the configuration of the present example is applicable irrespective of a printing width at which printing is performed in the single main scanning operation.

As for characteristics of performing powdering, for example, it is thought that when powdering is performed only to prevent offset, blocking, and the like, it is possible to, for example, directly spray minute powder to a printing face instead of using powdering ink as in the present example. However, in this case, it is though that minute powder scatters in and around a device, which degrades work environment, for example. Addition of a component (for example, a filter, or a component for ventilation and evacuation) for preventing powder scattering potentially may lead to large cost increase. However, in the present example, since powdering ink, which is liquid, is used, it is possible to appropriately prevent powder scattering and the like without using a special component or the like that largely increases cost. Accordingly, for example, it is possible to more appropriately perform powdering while preventing degradation of work environment. In this case, for example, it is possible to perform powdering at various places without selecting a work place. Moreover, in the present example, for example, it is possible to more uniformly apply powder to the medium 50 by using fast-drying powdering ink.

The configuration of the printing apparatus 10 is not limited to a configuration described above but may be further changed in various manners. For example, the above description is mainly made on, as the configuration of the printing apparatus 10, an exemplary serial configuration for performing the main scanning operation and the sub scanning operation. In this case, various settings for one path or a plurality of paths (multipath print) may be performed for the number of passes, which is the number of times that the main scanning operation is performed at positions on the medium 50. Alternatively, a configuration other than a serial configuration may be used as the configuration of the printing apparatus 10. More specifically, a method of performing powdering by using powdering ink as described above can be excellently used for a line printer or the like that performs one-path printing in which an inkjet head passes through each position on the medium 50. In addition, change is possible in various manners, depending on the kind, disposition, operation method, and the like of the printing apparatus 10.

In the present example, a medium can be thought as, for example, an exemplary powdering object. For example, a plastic film or paper can be excellently used as a medium. However, a used medium and a print usage are particularly not limited. Thus, not only the above-described media but also, for example, metal, plastic plate, or fabric may be used as a medium. When these media are used, as well, it is possible to appropriately prevent blocking and the like by performing powdering.

The above description is mainly made on the operation that dries powdering ink through irradiation with ultraviolet rays right after landing on the medium 50. However, in a case of powdering ink, unlike color ink or the like, a problem such as occurrence of bleeding is unlikely to occur even when drying takes a long time. Thus, the timing of irradiation of powdering ink with ultraviolet rays may be set to be after some time has elapsed since landing on the medium 50.

The above description is mainly made on an exemplary configuration of the printing apparatus 10 for performing printing by the inkjet method. However, in a modification of the configuration of the printing apparatus 10, printing may be performed by a method other than the inkjet method. For example, powdering may be performed for a purpose other than prevention of blocking and the like. More specifically, in this case, for example, powdering may be performed to prevent adhesion of fingerprint on a powdering object. A configuration and a method for performing powdering in the printing apparatus 10 are also applicable to a field other than printing. In this case, a powdering object may be, for example, an object other than the medium 50 used for printing. With this configuration as well, it is possible to appropriately perform powdering on the object.

INDUSTRIAL APPLICABILITY

The present invention can be excellently used for, for example, a printing apparatus.

What is claimed is:

1. A printing apparatus configured to perform printing on a medium, the printing apparatus comprising:
   an ink ejection portion, configured to eject an ink to the medium; and
   a powdering portion, configured to perform powdering that applies powder to the medium,
   wherein the powdering portion comprises:
   a liquid applying device, configured to apply a powder containing liquid to the medium, wherein the powder containing liquid is a liquid including the powder and a solvent, and
   an energy ray emitting portion, configured to irradiate the powder containing liquid applied to the medium with energy rays,
   wherein the powder containing liquid is a liquid that generates heat when being irradiated with the energy rays,
   the energy ray emitting portion is configured to irradiate the powder containing liquid applied to the medium with the energy rays to evaporate the solvent of the powder containing liquid, so that the powder is exposed and adhered to a surface of the medium, and
   the powder containing liquid does not include a binder resin being a resin that remains on the medium after evaporation of the solvent, or includes an amount of the binder resin so that the powder does not scatter after the powder containing liquid is dried.

2. The printing apparatus according to claim 1, wherein the powder containing liquid includes an energy absorber as a material that generates heat by absorbing the energy rays.

3. The printing apparatus according to claim 1, wherein the powder containing liquid includes, as the powder, a powder of a material that generates heat by absorbing the energy rays.

4. The printing apparatus according to claim 1, wherein the energy ray emitting portion is configured to emit ultraviolet rays as the energy rays, and
   the powder containing liquid includes a powder of zinc oxide as the powder.

5. The printing apparatus according to claim 1, wherein the powder containing liquid includes the binder resin in a weight ratio of 15 weight % or lower relative to an entire of the powder containing liquid.

6. The printing apparatus according to claim 1, wherein the energy ray emitting portion is configured to emit the energy rays to the powder containing liquid applied to the medium, so that the powder containing liquid boils on the medium.

7. The printing apparatus according to claim 6, further comprising:
   an ink fixing device, configured to fix the ink to the medium, wherein the ink is ejected onto the medium by the ink ejection portion,
   wherein the ink ejection portion is configured to eject the ink that generates heat when being irradiated with the energy rays, and
   wherein the ink fixing device is configured to:
   irradiate the ink on the medium with the energy rays, so that the ink is fixed to the medium, and
   heat the ink without boiling the ink on the medium.

8. The printing apparatus according to claim 1, wherein the liquid applying device is an inkjet head configured to eject the powder containing liquid by an inkjet method.

9. The printing apparatus according to claim 1, wherein the medium is a medium that is taken up after printing.

10. A printing method of performing printing on a medium, the printing method comprising:
- causing an ink ejection portion to eject an ink to the medium;
- causing a powdering portion to perform powdering that applies a powder to the medium, wherein the powdering portion comprises:
  - a liquid applying device, configured to apply a powder containing liquid to the medium, wherein the powder containing liquid is a liquid including the powder and a solvent, and
  - an energy ray emitting portion, configured to irradiate the powder containing liquid applied to the medium with energy rays, and
  - the powder containing liquid is a liquid that generates heat when being irradiated with the energy rays, and the powder containing liquid does not include a binder resin being a resin that remains on the medium after evaporation of the solvent, or includes an amount of the binder resin so that the powder does not scatter after the powder containing liquid is dried; and
- causing the energy ray emitting portion to irradiate the powder containing liquid applied to the medium with the energy rays to evaporate the solvent of the powder containing liquid, so that the powder is exposed and adhered adheres to a surface of the medium.

11. A powdering apparatus configured to perform powdering that applies powder to an object, the powdering apparatus comprising:
- a liquid applying device, configured to apply a powder containing liquid to the object, wherein the powder containing liquid is a liquid including the powder and a solvent; and
- an energy ray emitting portion, configured to irradiate the powder containing liquid applied to the object with energy rays,
- wherein the powder containing liquid is a liquid that generates heat when being irradiated with the energy rays, and
- the energy ray emitting portion is configured to irradiate the powder containing liquid applied to the object with the energy rays to evaporate the solvent of the powder containing liquid, so that the powder is exposed and adhered to a surface of the object, and
- the powder containing liquid does not include a binder resin being a resin that remains on the object after evaporation of the solvent, or includes an amount of the binder resin so that the powder does not scatter after the powder containing liquid is dried.

* * * * *